(12) United States Patent
Ruppert

(10) Patent No.: US 9,320,188 B1
(45) Date of Patent: Apr. 26, 2016

(54) TOOL BLADES WITH MULTIPLE CUTTING EDGES

(71) Applicant: Jonathan Paul Ruppert, Walton, KY (US)

(72) Inventor: Jonathan Paul Ruppert, Walton, KY (US)

( * ) Notice: Subject to any disclaimer, the term of this patent is extended or adjusted under 35 U.S.C. 154(b) by 0 days.

(21) Appl. No.: 14/706,093

(22) Filed: May 7, 2015

Related U.S. Application Data

(60) Provisional application No. 62/085,120, filed on Nov. 26, 2014.

(51) Int. Cl.
| | | |
|---|---|---|
| *A01B 1/00* | (2006.01) | |
| *A01B 1/04* | (2006.01) | |
| *A01B 1/02* | (2006.01) | |
| *A01C 5/02* | (2006.01) | |
| *E21B 11/00* | (2006.01) | |

(52) U.S. Cl.
CPC ... *A01B 1/04* (2013.01); *A01B 1/02* (2013.01); *A01C 5/02* (2013.01); *E21B 11/005* (2013.01)

(58) Field of Classification Search
CPC .............. A01B 1/04; A01B 1/02; A01C 5/02; E21B 11/005; A47J 43/25
USPC ................ 294/49, 179, 50.8, 60; 172/13, 378, 172/371–377, 379–381; 241/273.4, 95, 168
See application file for complete search history.

(56) References Cited

U.S. PATENT DOCUMENTS

| | | | | |
|---|---|---|---|---|
| 307,742 | A | * 11/1884 | Bloch | A47J 43/25 241/273.4 |
| 1,027,345 | A | * 5/1912 | Lapin | A01B 1/02 294/49 |
| 1,101,713 | A | * 6/1914 | Putnam | A01G 3/06 172/13 |
| 1,146,609 | A | 7/1915 | Anderson | |
| 1,197,530 | A | * 9/1916 | Morris | A01B 1/08 172/371 |
| 1,286,779 | A | * 12/1918 | Rhomberg | A01B 1/08 172/371 |
| 2,066,803 | A | * 1/1937 | Sawyer | A01B 1/16 294/50.6 |
| 2,245,692 | A | * 6/1941 | Lamb | A01B 1/02 172/378 |
| 3,121,450 | A | * 2/1964 | Cronheim | A47J 43/25 241/101.01 |
| 5,601,325 | A | 2/1997 | Sokaski | |
| 6,564,881 | B2 | * 5/2003 | Murtagh | A01B 1/08 172/371 |
| 7,878,334 | B2 | 2/2011 | Tucker | |
| 8,388,031 | B1 | 3/2013 | Zang | |
| 2008/0309105 | A1 | * 12/2008 | Hayner | A01B 1/00 294/49 |
| 2011/0037282 | A1 | 2/2011 | Randolph et al. | |
| 2012/0133161 | A1 | 5/2012 | Mitchell | |
| 2014/0191521 | A1 | 7/2014 | Cantu | |

FOREIGN PATENT DOCUMENTS

CH             206670 A  *  8/1939  .............. A47J 43/25

* cited by examiner

*Primary Examiner* — Gabriela Puig
(74) *Attorney, Agent, or Firm* — Dale J. Ream

(57) ABSTRACT

A tool blade for use with a handle includes a pan having a top surface and bottom surface opposite the top surface, the pan having a top edge and a cutting edge opposite the top edge and having a pair of opposed side edges extending between the top edge and the cutting edge. The top edge of the pan includes a handle sleeve defining a channel configured to receive an end of the handle. The bottom edge is integrally connected to the pan and is sharpened so as to penetrate a ground surface. A plurality of grating teeth is formed on the pan, each grating tooth having a scoop projecting outwardly from the pan and a cutout. A cutout traverses through the pan and defines an opening connecting the top and bottom surfaces. A respective scoop includes a portion partially covering the cutout and having an arcuate cutting edge.

17 Claims, 20 Drawing Sheets

TOOL BLADES WITH MULTIPLE CUTTING EDGES

REFERENCE TO RELATED APPLICATIONS

This application claims the benefit of provisional patent application U.S. Ser. No. 62/085,120 filed Nov. 26, 2014 titled Tool Blades with Multiple Cutting Edges and which is incorporated herein by reference.

FIELD OF THE INVENTION

The present invention relates generally to shovels and similar hand-operated excavation tools. More particularly, the present invention relates to excavating tools provided with grated blades, adding multiple cutting edges that improve the usefulness of existing tools.

BACKGROUND OF THE INVENTION

Many shovels, posthole diggers, hoes, and other hand-operated excavation tools, whether long-handled or short-handled, have traditionally included a blade with a single primary cutting edge at the forefront of the blade. The blade is usually reasonably sharp so as to cut into the soil of a ground surface when thrust downwardly by the user or when a top edge of the blade is stepped on. Some manufacturers have added holes in the face of tool blades so that, in addition to the conventional function of digging, they may also be used to sift soil. Other manufacturers have added tooth-like protrusions to the cutting edge of tool blades.

Although presumably effective for their intended purposes, the existing digging or cutting tools are often ineffective at penetrating or breaking up hard, rocky, or vegetative soil in order to extract and move the soil. Therefore, it would be desirable to have a tool blade having multiple cutting edges through the addition of a plurality of toothed, grater-like teeth and cutouts. Further, it would be desirable to have a tool blade in which each tooth has a scoop projecting outwardly from a surface of a pan and the cutout defines an opening through the pan through which soil collected by the scoop may pass through the pan.

SUMMARY OF THE INVENTION

A tool blade for use with a handle according to the present invention includes a pan having a top surface and bottom surface opposite the top surface, the pan having a top edge and a cutting edge opposite the top edge and having a pair of opposed side edges extending between the top edge and the cutting edge. The top edge of the pan includes a handle sleeve defining a channel configured to receive a lower end of the handle. The bottom edge is integrally connected to the pan and is sharpened so as to selectively penetrate a ground surface. A plurality of grating teeth is formed on the pan, each grating tooth having a scoop projecting outwardly from the pan and a cutout.

A respective cutout traverses through the pan and defines an opening connecting the top and the bottom surface. A respective scoop includes a portion partially covering the cutout and having an arcuate cutting edge, the cutting edge lying in a plane substantially normal to a corresponding surface of the pan from which it projects and facing the cutting edge such that the scoop extends substantially longitudinally along the pan toward the handle sleeve.

Therefore, a general object of this invention is to provide a tool blade having multiple cutting edges to enhance breaking up soil to be extracted and moved.

Another object of this invention is to provide a tool blade, as aforesaid, having a plurality of grater-like teeth and defining a plurality of cutouts.

Still another object of this invention is to provide a tool blade, as aforesaid, in which each respective tooth includes a scoop projecting outwardly from a surface of a pan each cutout defines an opening through the pan.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

A tool blade with multiple cutting edges according to embodiments of the present invention will now be described with reference to FIGS. 1 to 22 of the accompanying drawings.

Figure 1:
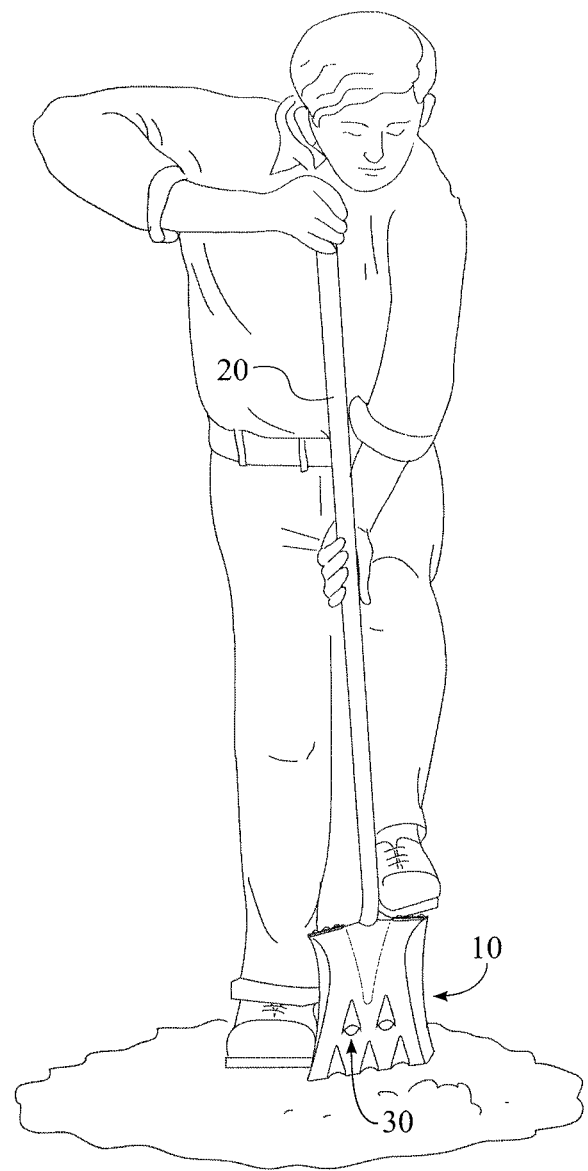
FIG. 1 is an environmental perspective view of an individual using the present invention.
Figure 2:
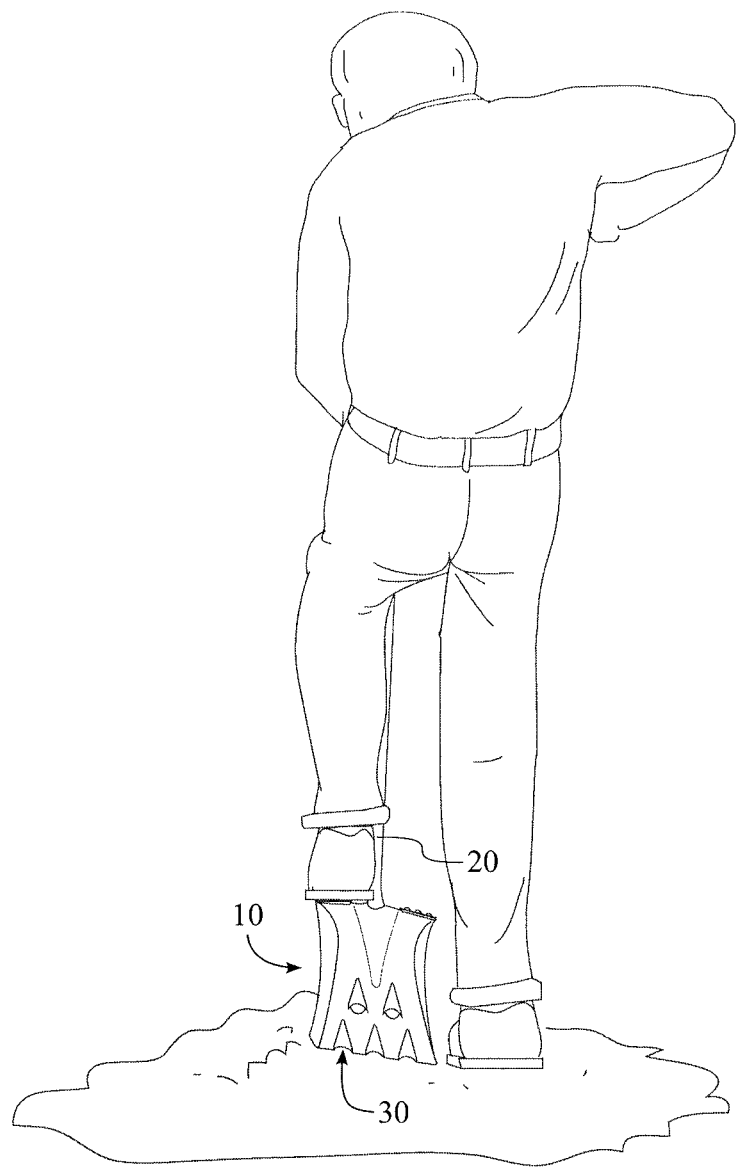
FIG. 2 is another environmental perspective view of an individual using the present invention.

The present invention integrates toothed, grater-like cutouts to existing tool blades of shovels, posthole diggers, hoes, and other similar hand-operated excavation tools to increase the excavating capability thereof. Referring to the drawings, particularly FIGS. 1 and 2, the present invention comprises a tool having a tool blade 10 made of sheet steel or hard plastic connected to a handle 20, which is known in the prior art, and a plurality of grating teeth 30. The tool blade 10 may be a conventional flat shovel blade, spade shovel blade, or one half of a pair of posthole digger blades, as shown in FIGS. 3-8, FIGS. 9-14, and FIGS. 15-21, respectively. As previously mentioned and as can be appreciated by those skilled in the art, the tool blade 10 may also be that of a hoe, trowel, soil scoop, drain spade, and the like. The plurality of grating teeth 30 is integrally formed on the tool blade 10 to provide cutting assistance and allow the passage of soil and heavier objects such as rocks therethrough.

Figure 3:
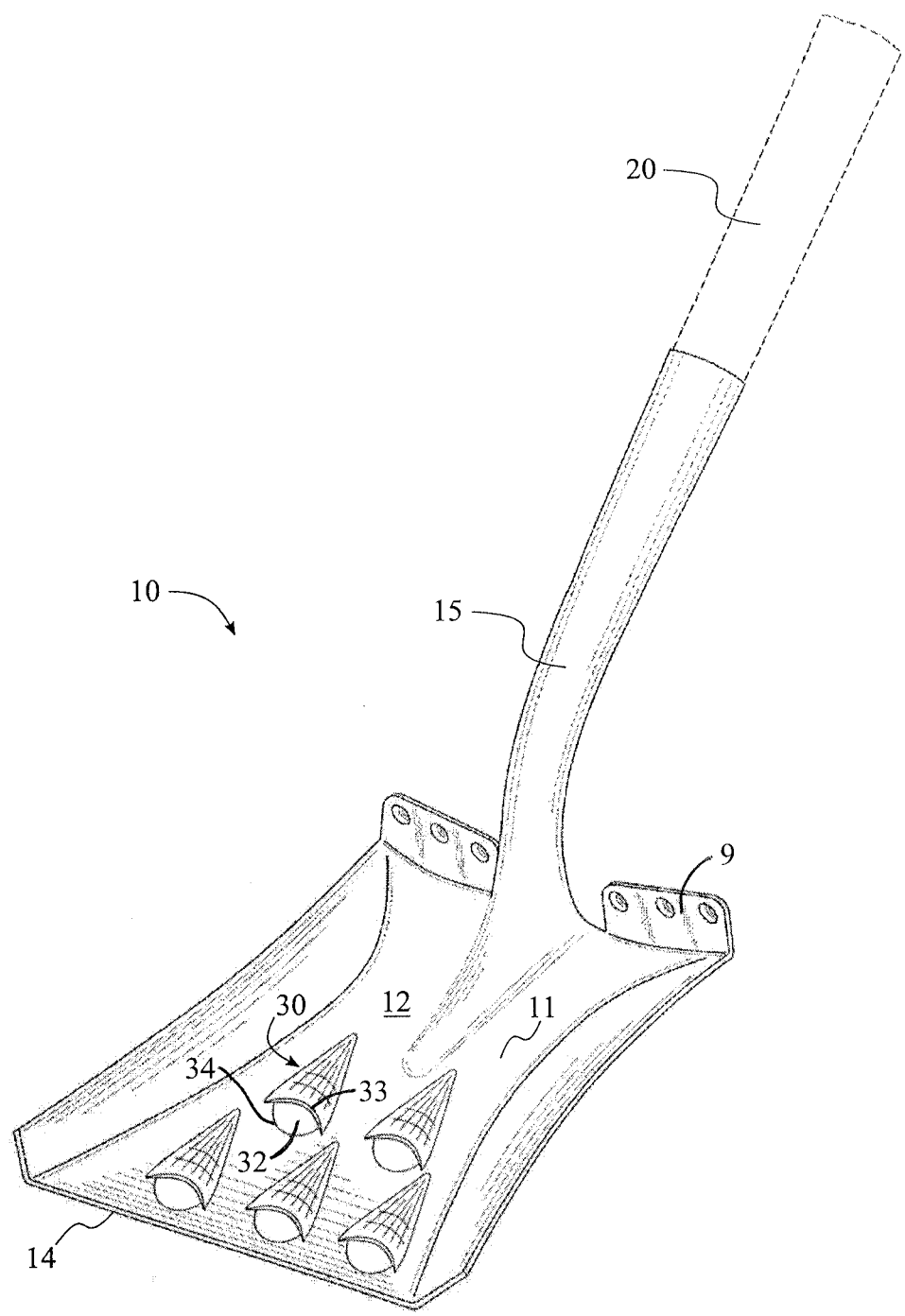
FIG. 3 is a perspective view of a tool blade constructed in accordance with a first embodiment of the present invention.

Referring to FIGS. 3-21, the tool blade 10 generally comprises a pan 11 with top surface 12 and bottom surface 13, a top edge 9, a cutting edge 14, and a handle sleeve 15. The handle sleeve 15 may define a channel configured to receive a lower end of a handle 20. The pan 11 is the thin structure that cuts into and collects earth to be moved from one location to another, where the top and bottom surfaces 12 and 13 constitute the opposing surfaces of pan 11. The top surface 12 may be substantially concave to hold removed earth while a user lifts the tool, as in the case of a spade shovel blade, posthole digger blade, or the like as shown in FIGS. 9-14 and FIGS. 15-21. Alternatively, the top surface 12 may be generally flat and may or may not have upwardly curved sides to hold removed earth while a user lifts the tool, as in the case of a flat shovel blade or the like as shown in FIGS. 3-8. The bottom surface 13 therefore follows the shape of the top surface 12 and is substantially convex or flat. The cutting edge 14 is integrally formed with one end of the pan 11 opposite the top edge and sharpened to allow the tool blade 10 to easily cut through earth. The handle sleeve 15 is integrally formed with the pan 11 at the end thereof opposite the cutting edge 14 and configured to receive the end of the handle 20 therein. In an embodiment, the top edge 9 is generally flat and perpendicular relative to the pan 11 so as to provide a ledge for a user to step on in order to push the cutting edge 14 into a ground surface (FIGS. 1-3).

Figure 22:
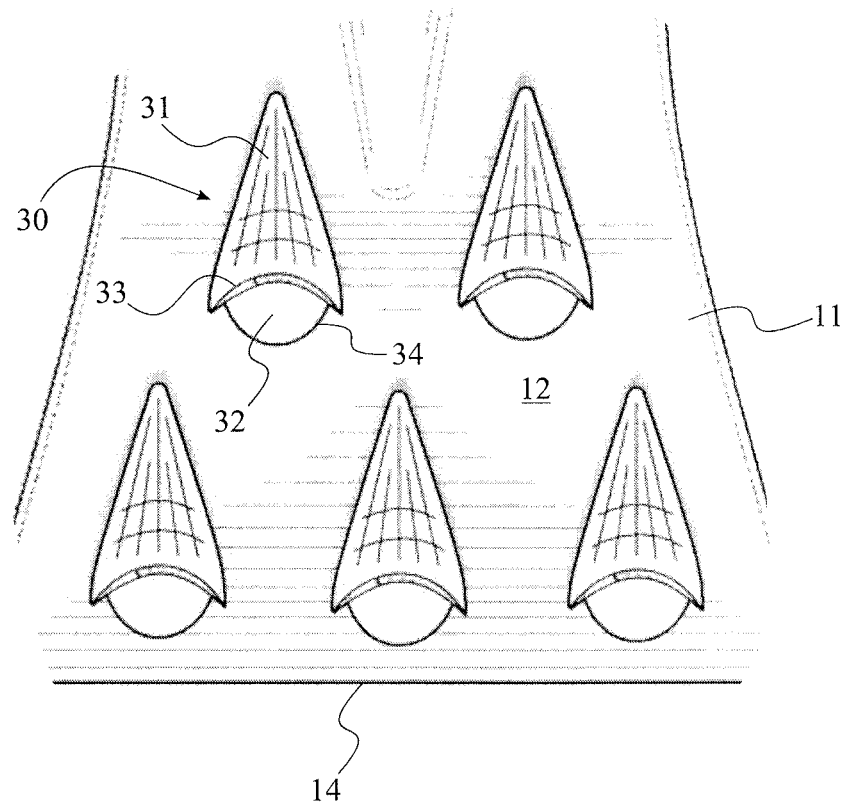
FIG. 22 is a magnified view of the plurality of grating teeth elements which are characteristic of all embodiments of the present invention.

The plurality of grating teeth 30 is integrally formed on the pan 11 on the top surface 12, bottom surface 13, or both surfaces. As shown in FIG. 22, each of the plurality of teeth 30 generally comprises a scoop 31 and a cutout 32. For each of the teeth, the scoop 31 is a uniform rounded generally conical or triangular shape projecting outwardly from the corresponding surface of the pan 11 that partially covers the cutout 32, where the cutout 32 traverses through the pan 11, providing an opening connecting the top and bottom surfaces 12 and 13. The portion of the scoop 31 partially covering the cutout 32 has an arcuate cutting edge 33. The arcuate cutting edge 33 lies in a plane substantially normal to the corresponding surface of the pan 11 and faces the cutting edge 14 such that the scoop 31 extends substantially longitudinally along the pan 11 towards the handle sleeve 15. The arcuate cutting edge 33 may be sharpened to provide further cutting assistance to the tool blade 10. The cutout 32 has a tapered edge 34 facing the cutting edge 14 to allow soil, rocks, and the like to pass through the cutout 32 without becoming stuck.

Figure 4:
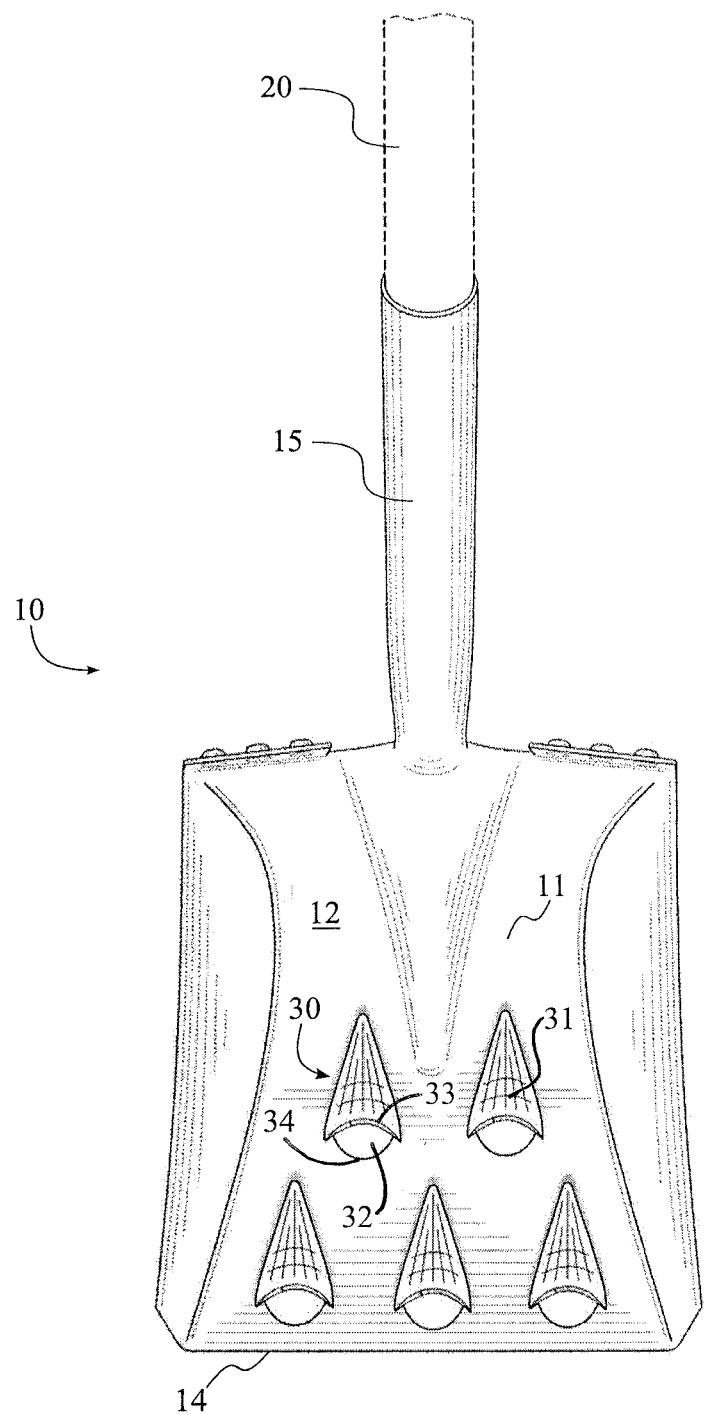
FIG. 4 is a front view of a tool blade constructed in accordance with a first embodiment of the present invention.
Figure 5:
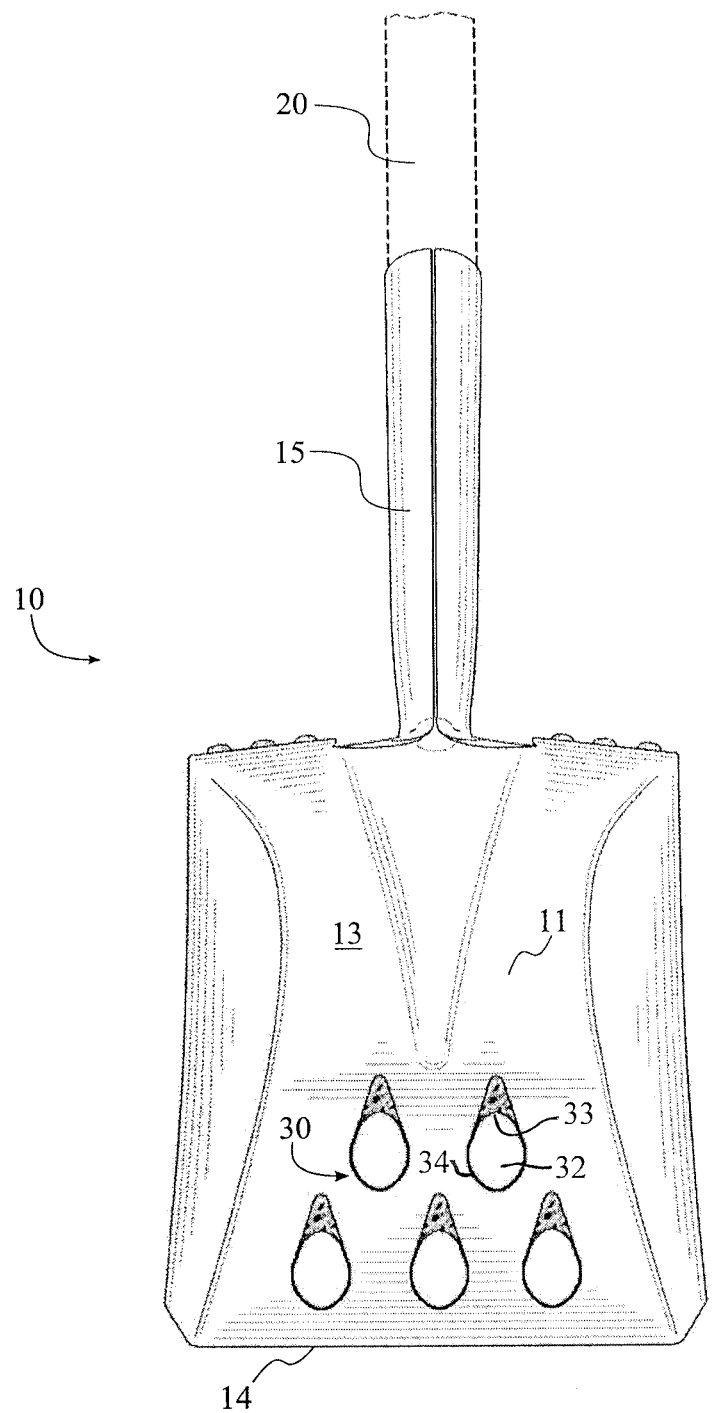
FIG. 5 is a back view of a tool blade constructed in accordance with a first embodiment of the present invention.
Figure 6:
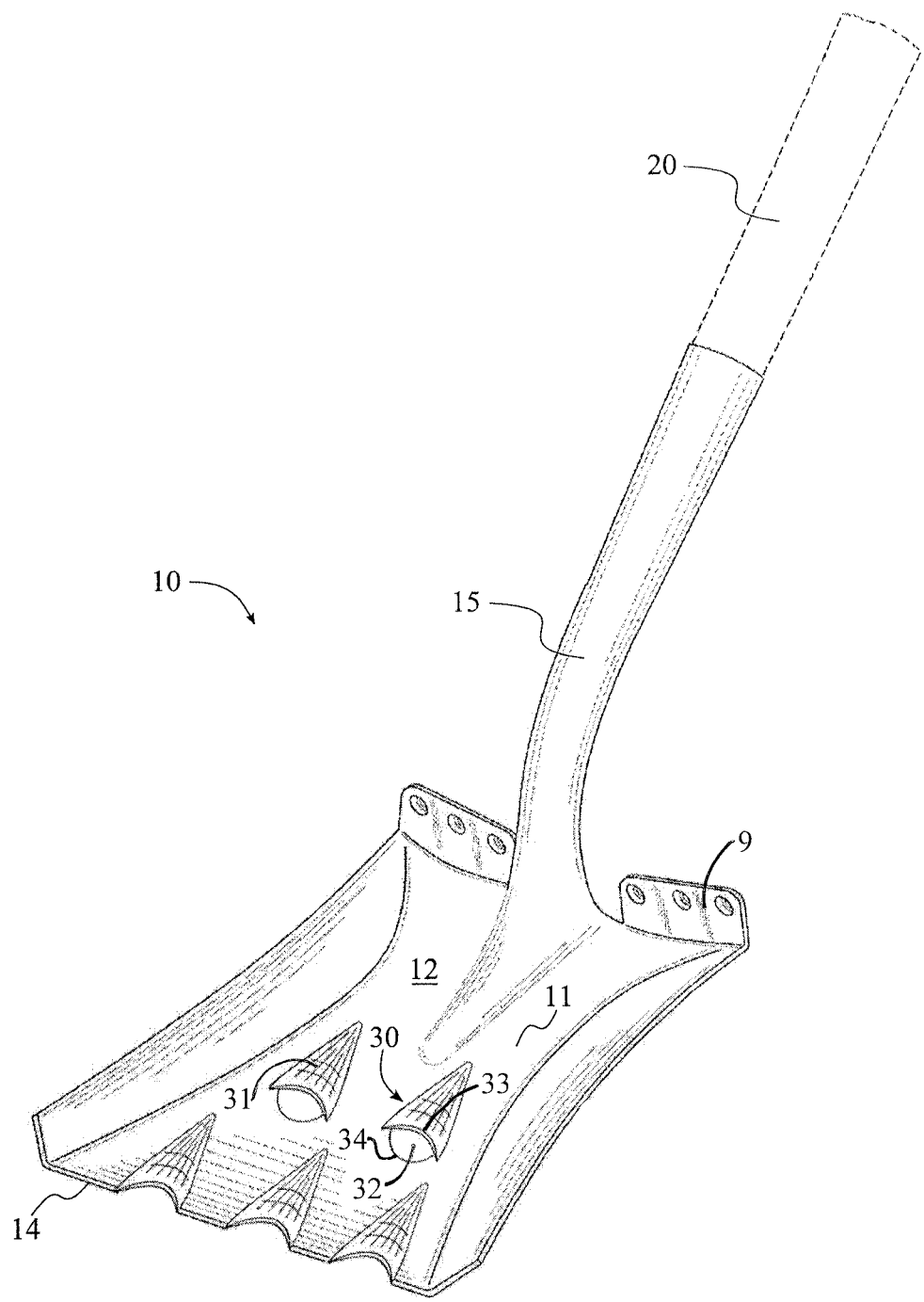
FIG. 6 is a perspective view of a tool blade constructed in accordance with a second embodiment of the present invention.
Figure 7:
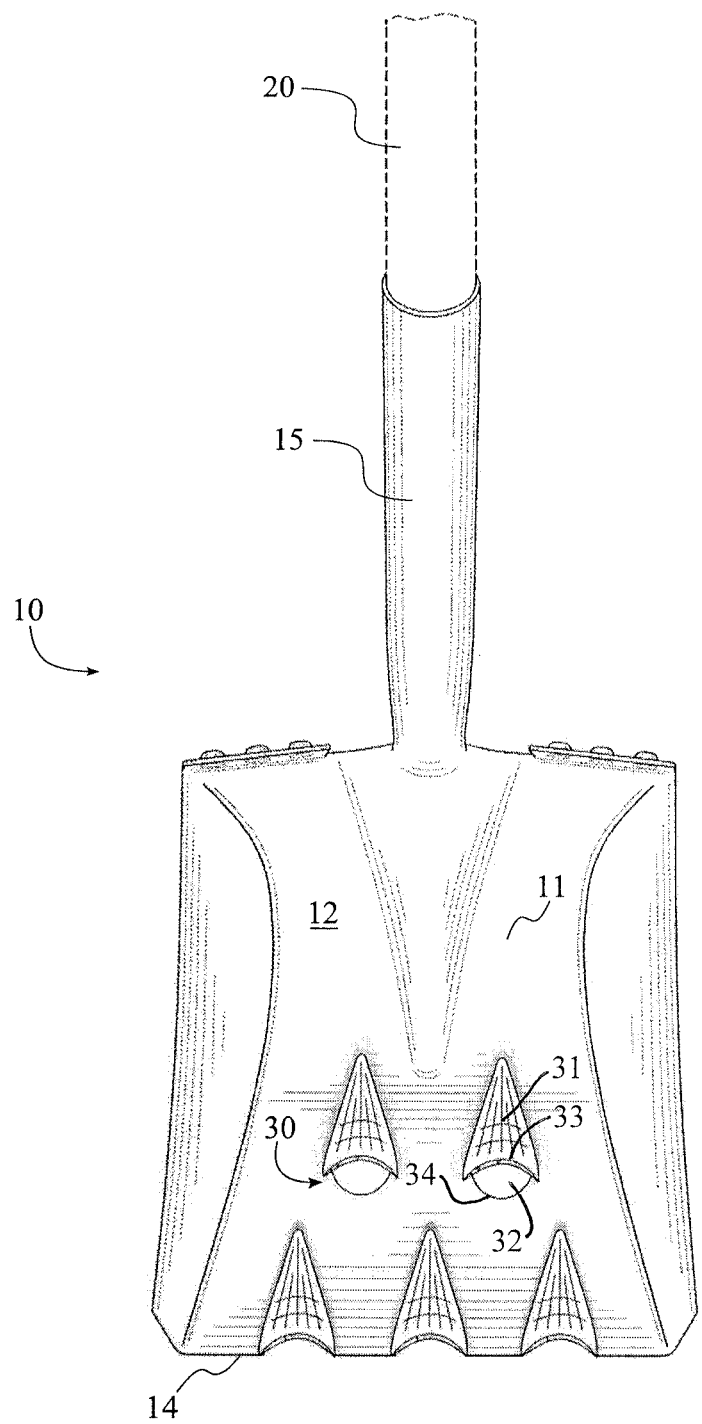
FIG. 7 is a front view of a tool blade constructed in accordance with a second embodiment of the present invention.
Figure 8:
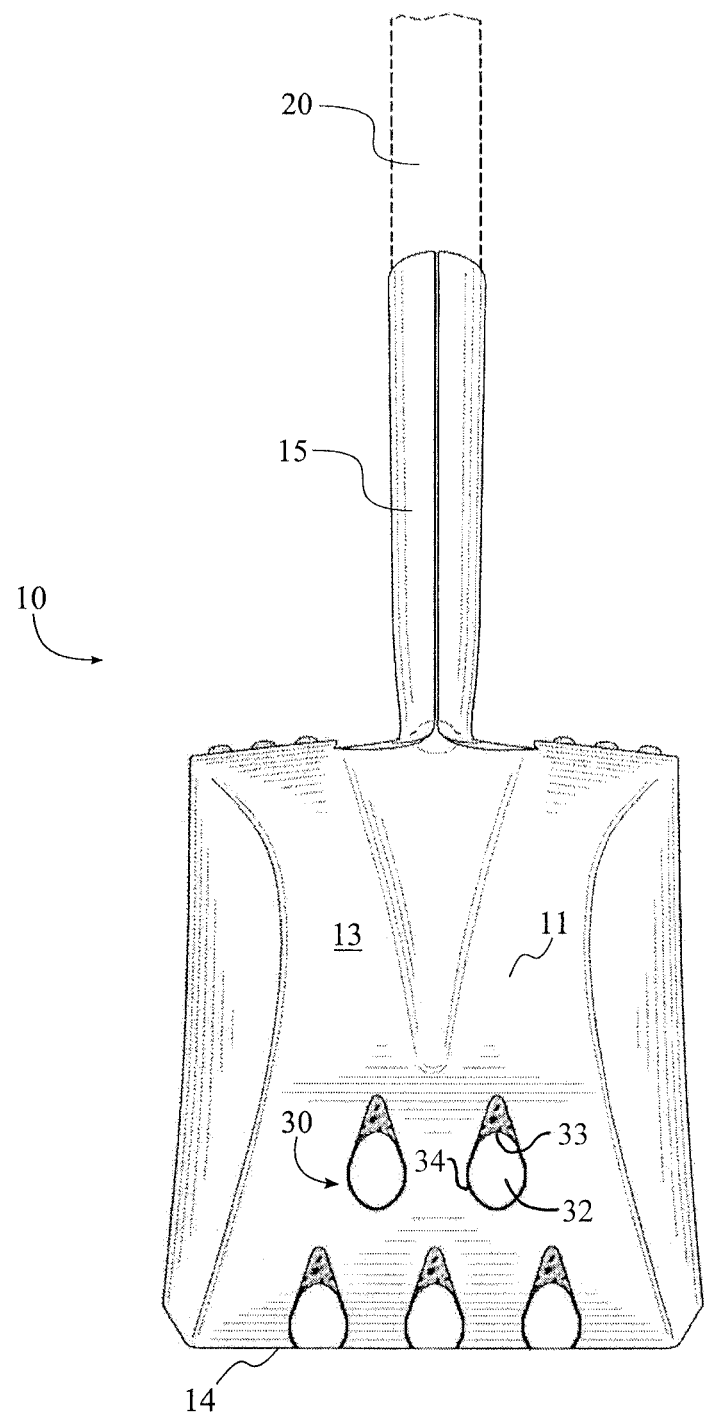
FIG. 8 is a back view of a tool blade constructed in accordance with a second embodiment of the present invention.
Figure 9:
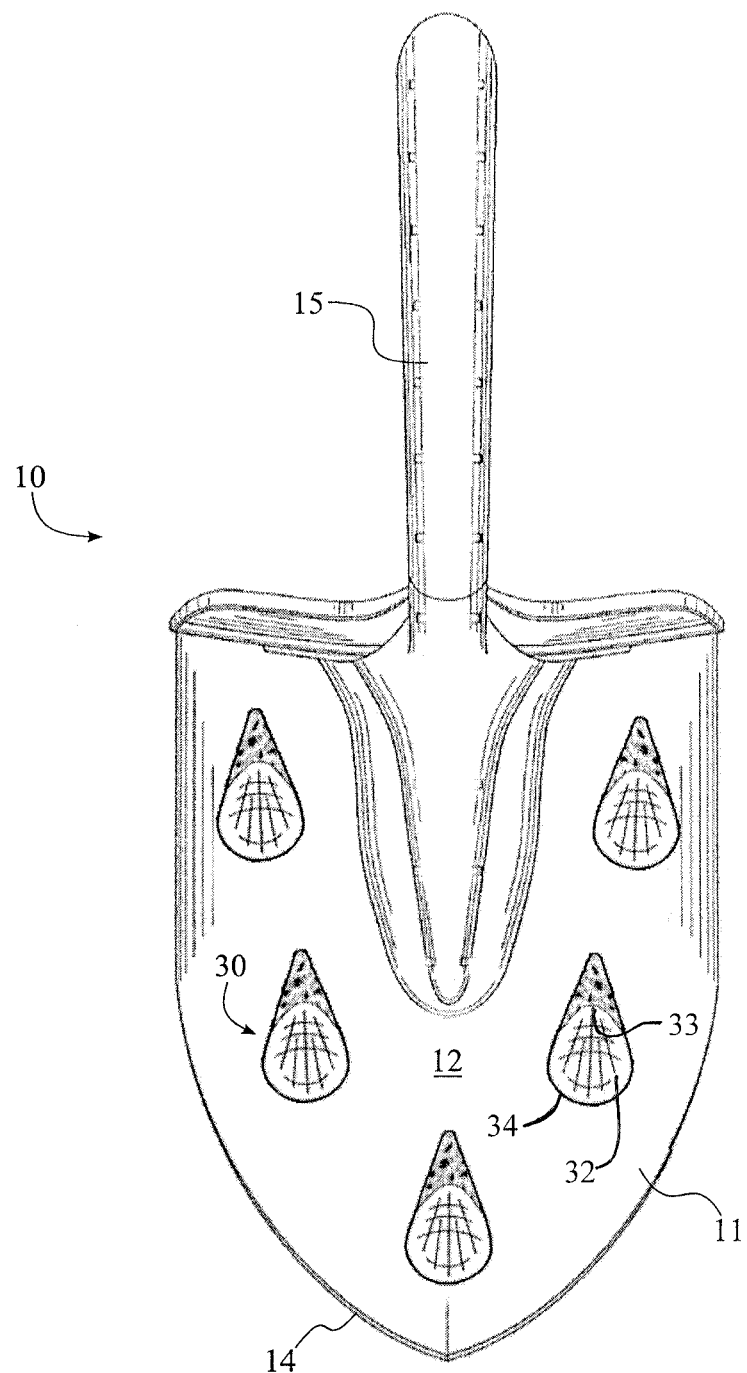
FIG. 9 is a front view of a tool blade constructed in accordance with a third embodiment of the present invention.
Figure 10:
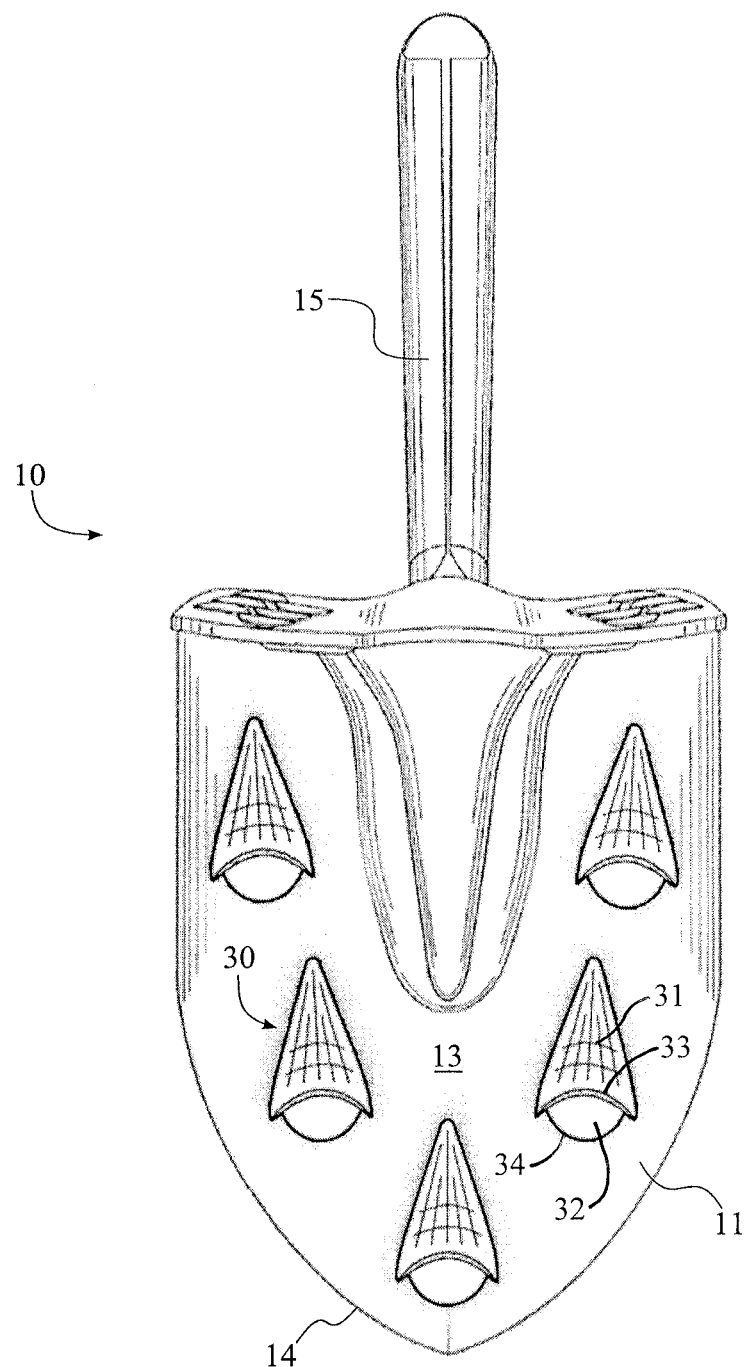
FIG. 10 is a back view of a tool blade constructed in accordance with a third embodiment of the present invention.
Figure 11:
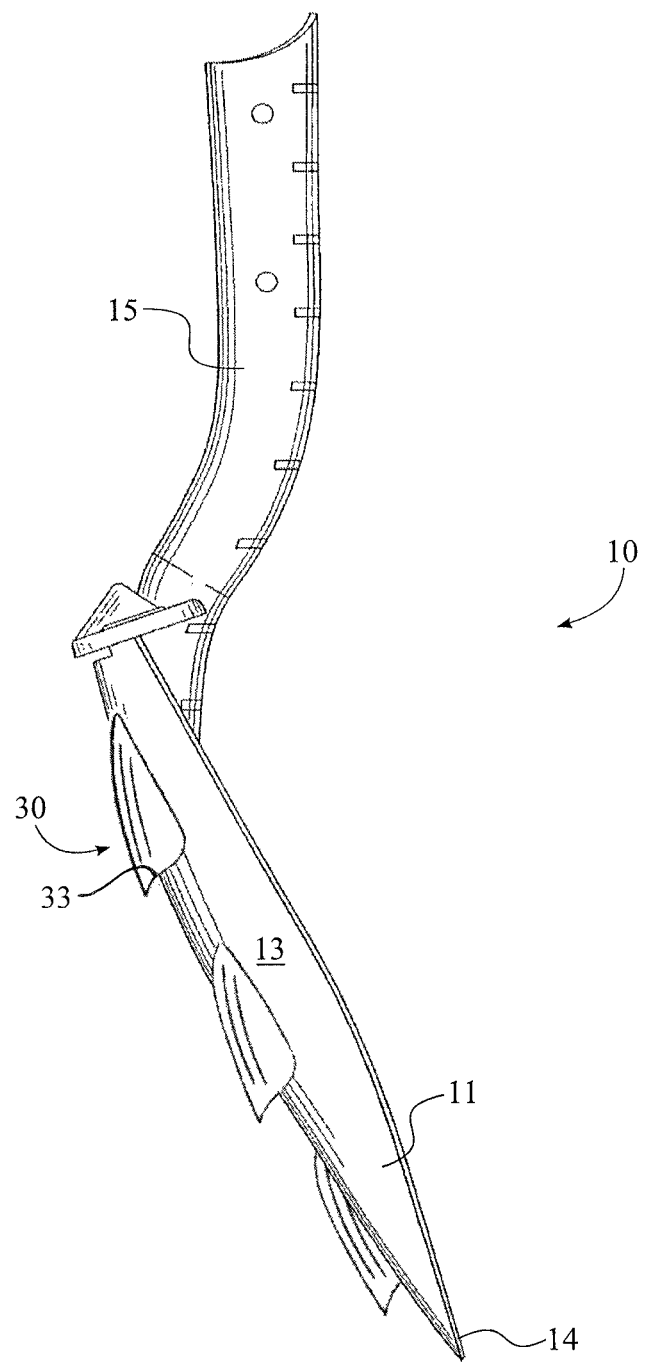
FIG. 11 is a left view of a tool blade constructed in accordance with a third embodiment of the present invention.
Figure 12:
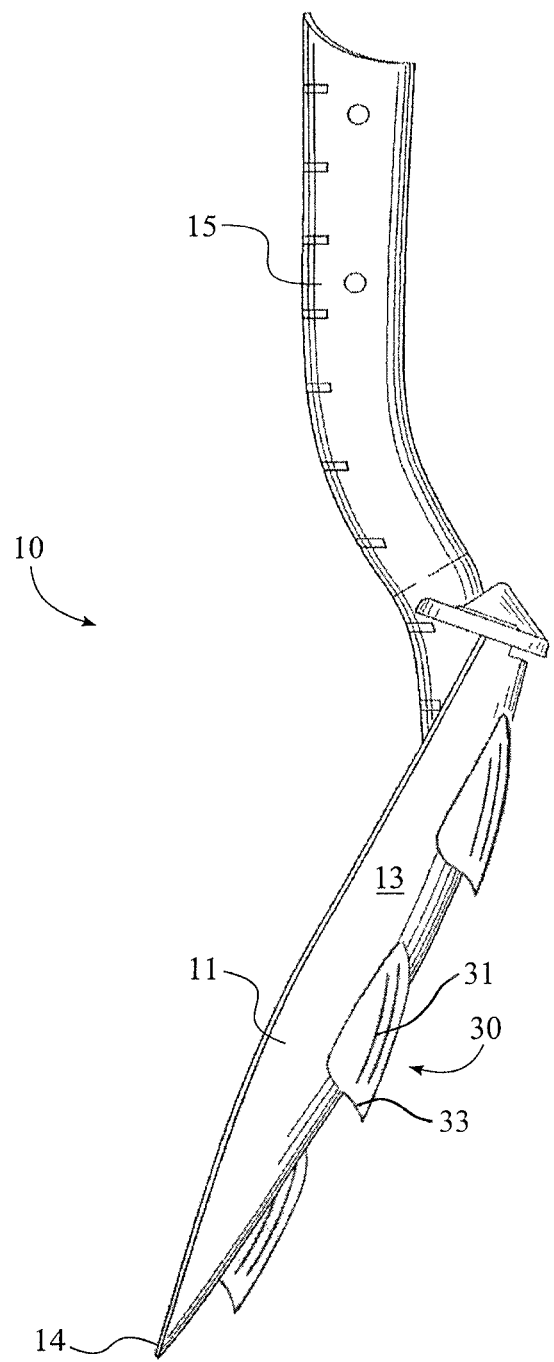
FIG. 12 is a right view of a tool blade constructed in accordance with a third embodiment of the present invention.
Figure 13:
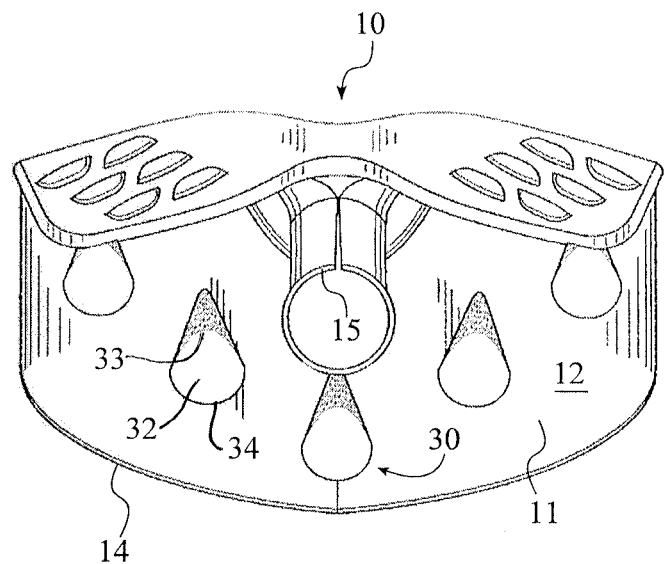
FIG. 13 is a top view of a tool blade constructed in accordance with a third embodiment of the present invention.
Figure 14:
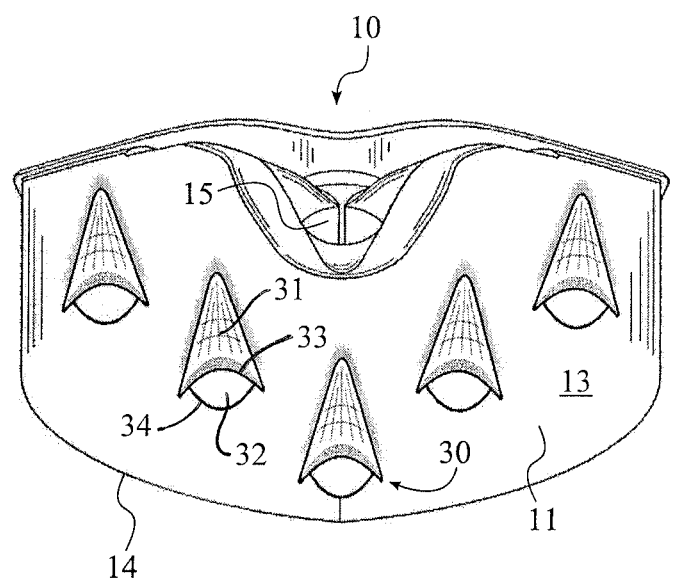
FIG. 14 is a bottom view of a tool blade constructed in accordance with a third embodiment of the present invention.
Figure 15:
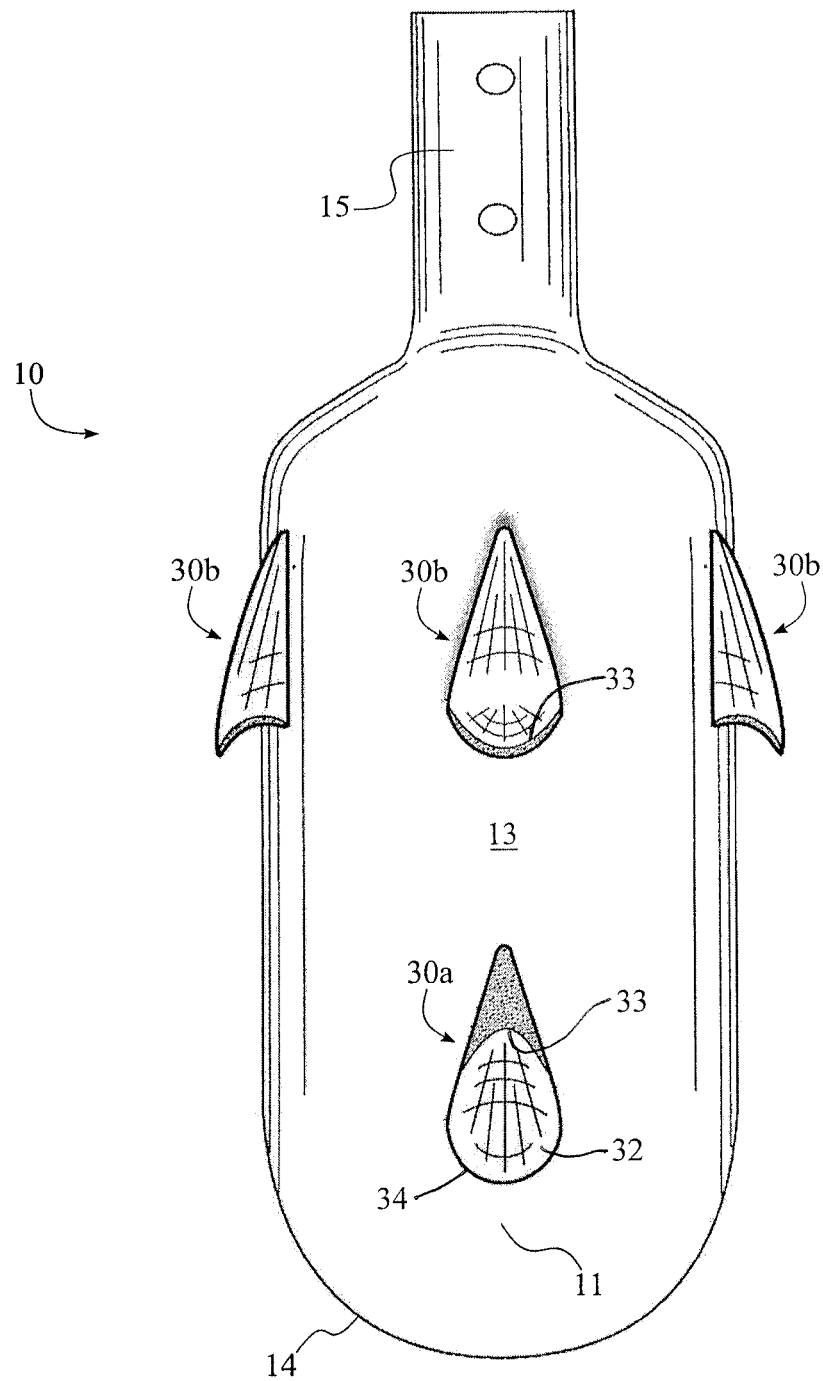
FIG. 15 is a back view of a tool blade constructed in accordance with a fourth embodiment of the present invention.
Figure 16:
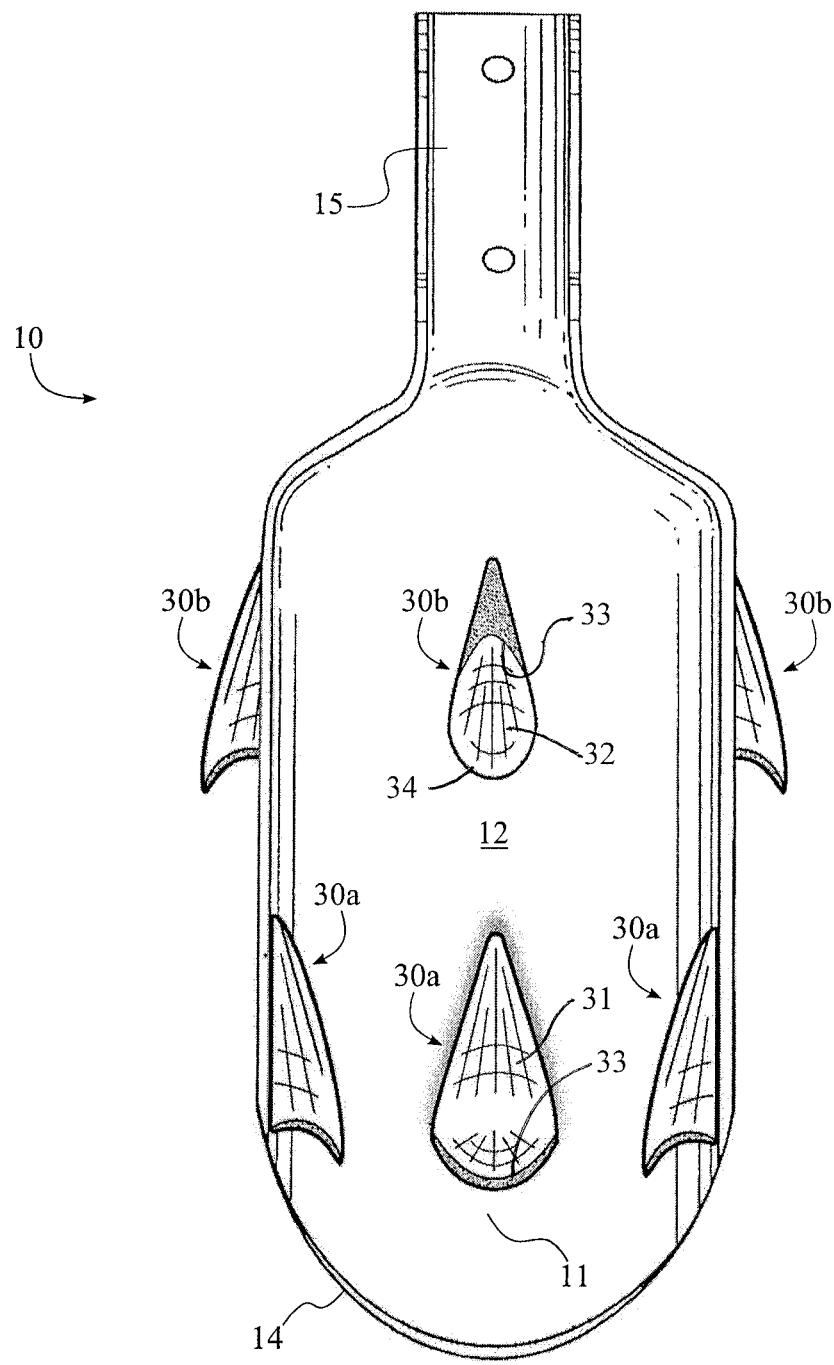
FIG. 16 is a front view of a tool blade constructed in accordance with a fourth embodiment of the present invention.
Figure 17:
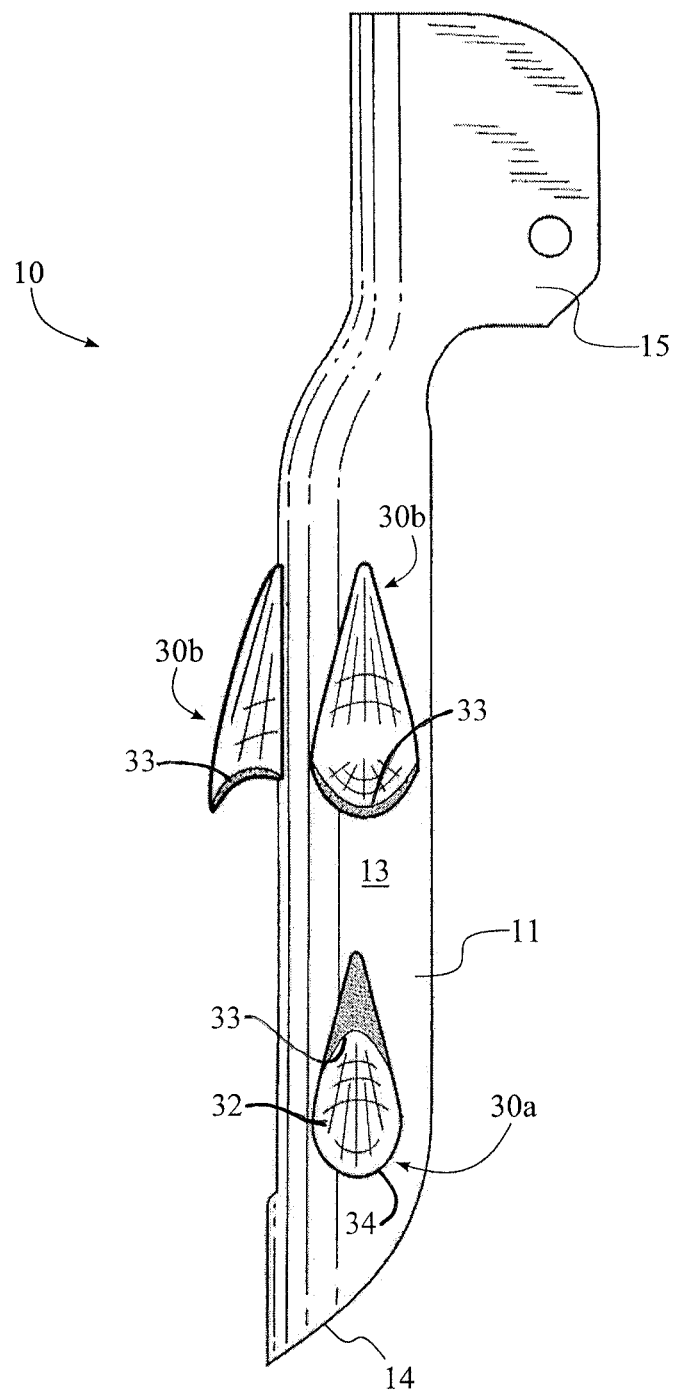
FIG. 17 is a left view of a tool blade constructed in accordance with a fourth embodiment of the present invention.
Figure 18:
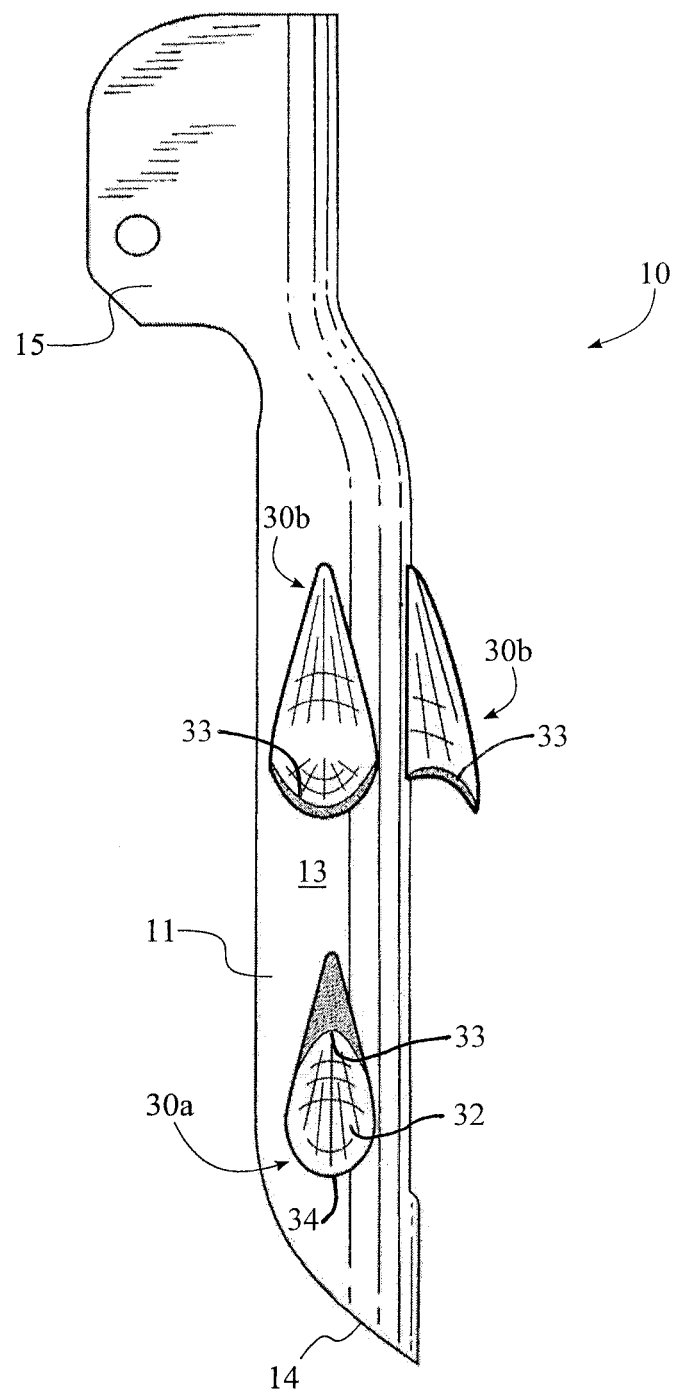
FIG. 18 is a right view of a tool blade constructed in accordance with a fourth embodiment of the present invention.
Figure 19:
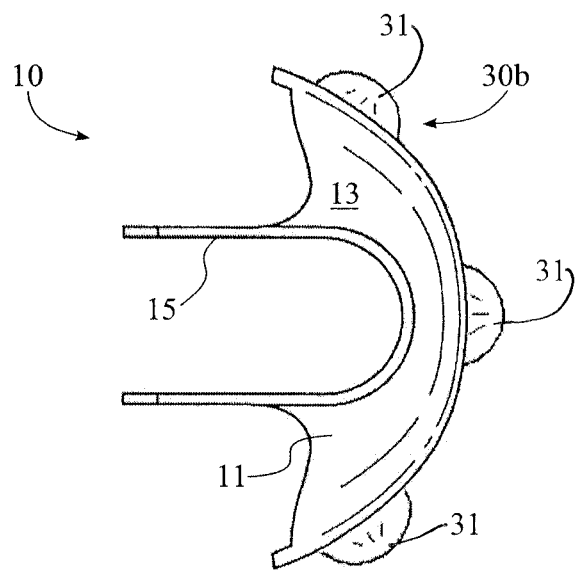
FIG. 19 is a top view of a tool blade constructed in accordance with a fourth embodiment of the present invention.
Figure 20:
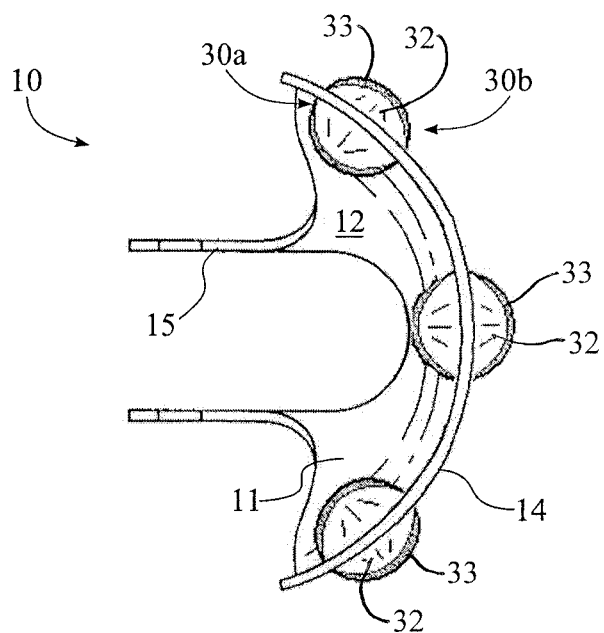
FIG. 20 is a bottom view of a tool blade constructed in accordance with a fourth embodiment of the present invention.
Figure 21:
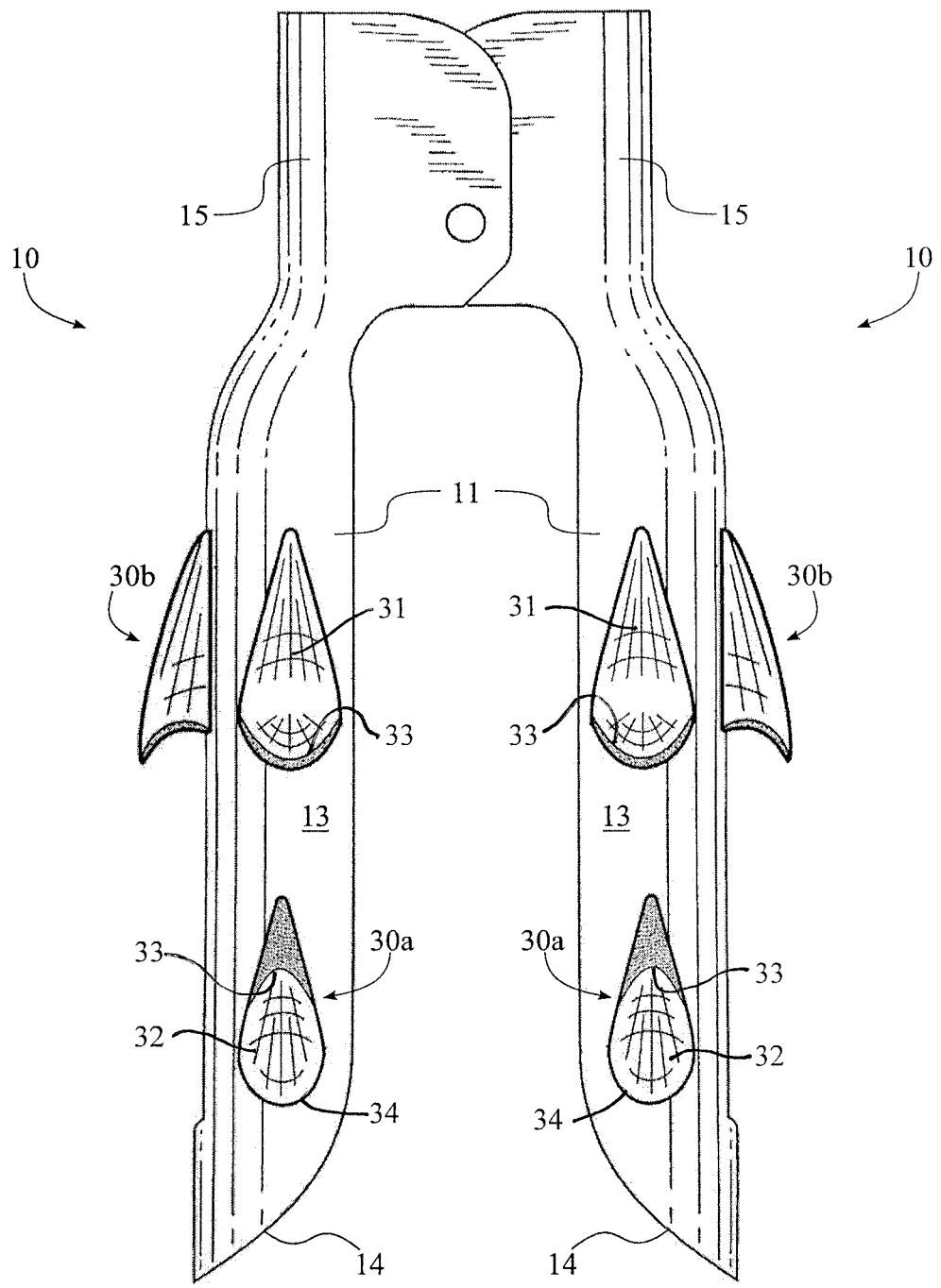
FIG. 21 shows to blades of a posthole digger connected together with features of the present invention according to a fourth embodiment.

The plurality of teeth 30 are typically arranged in spaced relationship on the pan 11, where any number of different arrangements may be utilized. For example, as shown in FIGS. 3-5, the teeth may be equidistantly spaced in offset rows with the scoops 31 protruding from the top surface 12 of the pan 11 of a flat shovel blade 10 such that each subsequent row of teeth is unobstructed by the previous. As shown in FIGS. 6-8, one such row of teeth may be integrated into the cutting edge 14 of the flat shovel blade 10. In another example, as shown in FIGS. 9-14, the teeth may be arranged symmetrically in a spaced spade pattern with the scoops 31 protruding from the bottom surface 13 of a spade shovel blade 10. In yet another example, as shown in FIGS. 15-21, the scoops 31 of the teeth may be disposed on both the top and bottom surfaces 12 and 13 of the blade of a posthole digger. Because posthole diggers utilize two opposing blades that face each other to extract generally circular columns of earth, the teeth may be arranged in rows along both blades to create circular patterns of teeth. In this case, one row of a circular pattern of teeth 30a may protrude entirely from top surface 12, and another row of a circular pattern of teeth 30b may protrude entirely from the bottom surface 13.

Although the invention has been explained in relation to its preferred embodiment, it is to be understood that many other possible modifications and variations can be made without departing from the spirit and scope of the invention. It is understood that while certain forms of this invention have been illustrated and described, it is not limited thereto except insofar as such limitations are included in the following claims and allowable functional equivalents thereof.

The invention claimed is:

1. A tool blade for use with a handle, comprising:
   a pan having a top surface and a bottom surface opposite said top surface, said pan having a top edge and a cutting edge opposite said top edge and having a pair of opposed side edges extending between said top edge and said cutting edge;
   wherein said top edge includes a handle sleeve defining a channel configured to receive a lower end of the handle;
   wherein said bottom edge is integrally connected to said pan and is sharpened so as to selectively penetrate a ground surface;
   a plurality of grating teeth formed on said pan, each grating tooth having a scoop projecting outwardly from said pan and a cutout; wherein each cutout has a tapered edge configured so as to permit material collected in said scoop to pass through said cutout.

2. A tool blade for use with a handle, comprising: a pan having a top surface and a bottom surface opposite said top surface, said pan having a top edge and a cutting edge opposite said top edge and having a pair of opposed side edges extending between said top edge and said cutting edge; wherein said top edge includes a handle sleeve defining a channel configured to receive a lower end of the handle; wherein said bottom edge is integrally connected to said pan and is sharpened so as to selectively penetrate a ground surface; a plurality of grating teeth formed on said pan, each grating tooth having a scoop projecting outwardly from said pan and a cutout; wherein said cutout in each of said plurality of grating teeth traverses through said pan and defines an opening connecting said top and said bottom surface; and said scoop in each of said plurality of grating teeth includes a portion partially covering said cutout and having an arcuate cutting edge, said cutting edge lying in a plane substantially normal to a corresponding surface of said pan from which it projects, wherein said scoop extends substantially longitudinally along said pan toward said handle sleeve.

3. The tool blade as in claim 1, wherein each cutout has a tapered edge configured so as to permit material collected in said scoop to pass through said cutout.

4. The tool blade as in claim 2, wherein said respective scoop has a uniform rounded shape.

5. The tool blade as in claim 2, wherein said respective scoop has a generally conical or triangular shape.

6. The tool blade as in claim 1, wherein said top edge of said pan is flat and generally perpendicular to said top surface so as to form a ledge for a user to step on to increase a downward force on said cutting edge.

7. The tool blade as in claim 1, wherein said side edges have an upwardly curved configuration or a straight configuration.

8. The tool blade as in claim 1, wherein said top surface of said pan has a generally concave configuration so as to hold removed material when a user lifts the tool blade.

9. The tool blade as in claim 1, wherein said top surface of said pan has a generally flat configuration.

10. The tool blade as in claim 1, wherein said plurality of teeth is arranged in a spaced apart relationship on said pan.

11. The tool blade as in claim 10, wherein said plurality of teeth is arranged in offset rows with respective teeth projecting from said top surface of said pan such that each subsequent row of respective teeth is not obstructed by a previous row.

12. The tool blade as in claim 11, wherein a respective offset row of teeth is integrated into said cutting edge of said pan.

13. The tool blade as in claim 1, wherein said plurality of teeth project from said bottom surface of said pan.

14. The tool blade as in claim 1, wherein said plurality of teeth project from both said top surface of said pan and from said bottom surface of said pan.

15. The tool blade as in claim 1, wherein said pan includes a pair of opposing pan portions that face one another, said plurality of teeth projecting from respective rear surfaces of said pair of opposed pan portions.

16. The tool blade as in claim 15, wherein said plurality of teeth is arranged in rows so as to create circular patterns of teeth.

17. The tool blade as in claim 1, wherein:

said plurality of teeth project from said bottom surface of said pan;

said plurality of teeth is arranged in offset rows with respective teeth projecting from said bottom surface of said pan such that each subsequent row of respective teeth is not obstructed by a previous row.

* * * * *